United States Patent
Yoshida

(10) Patent No.: US 7,893,966 B2
(45) Date of Patent: Feb. 22, 2011

(54) APPARATUS AND METHOD FOR CONTROLLING EDITING AND USE OF IMAGE PROCESSING PARAMETERS IN IMAGE PROCESSING

(75) Inventor: Akimitsu Yoshida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 892 days.

(21) Appl. No.: 11/765,651

(22) Filed: Jun. 20, 2007

(65) Prior Publication Data

US 2008/0002035 A1    Jan. 3, 2008

(30) Foreign Application Priority Data

Jun. 30, 2006  (JP) ............................. 2006-182183
Jul. 21, 2006  (JP) ............................. 2006-200054

(51) Int. Cl.
    H04N 5/228    (2006.01)
(52) U.S. Cl. .................................................. 348/222.1
(58) Field of Classification Search ............... None
    See application file for complete search history.

(56) References Cited

U.S. PATENT DOCUMENTS

2003/0090690 A1* 5/2003 Katayama et al. ............ 358/1.9
2003/0231246 A1* 12/2003 Gindele et al. ............ 348/222.1
2005/0280717 A1* 12/2005 Sugimoto ................ 348/222.1

FOREIGN PATENT DOCUMENTS

JP    09-200730    7/1997
JP    2005-101828    4/2005

* cited by examiner

*Primary Examiner*—Justin P Misleh
(74) *Attorney, Agent, or Firm*—Cowan, Liebowitz & Latman, P.C.

(57) ABSTRACT

An information processing apparatus for editing an image processing parameter available in image processing by an image sensing apparatus. Creator information set by a creator of the image processing parameter, attached to the image processing parameter, is extracted. In accordance with the extracted creator information, editing processing to generate a new image processing parameter by editing the image processing parameter is limited.

13 Claims, 14 Drawing Sheets

FIG. 14

| ADJUSTMENT PERMISSION/PROHIBITION INFORMATION | | |
|---|---|---|
| ADJUSTMENT ITEM | ADJUSTMENT PERMISSION /PROHIBITION | ADJUSTABLE RANGE |
| SHARPNESS | ○ | −2 ~ +2 |
| CONTRAST | ○ | −2 ~ +2 |
| COLOR DEPTH | ○ | −1 ~ +1 |
| COLOR TINT | × | − |
| ... | ... | ... |

APPARATUS AND METHOD FOR CONTROLLING EDITING AND USE OF IMAGE PROCESSING PARAMETERS IN IMAGE PROCESSING

BACKGROUND OF THE INVENTION

1. Field of the Invention

The present invention relates to generation of an image processing parameter utilized in image processing.

2. Description of the Related Art

A digital camera which is rapidly becoming popular in recent years is characterized by facility of management and processing of images since the images are recorded as digital data. However, as digital data can be easily tampered with by combining or the like leaving no trace, the reliability of a photographed digital image as proof is a problem in some cases. Further, as digital data can be duplicated and distributed very easily, the right of a creator of an image (copyright holder) cannot be sufficiently protected. Accordingly, in recent years, a digital camera having a function of adding identity data to digital data recorded by the digital camera, for verifying that the digital data has not been tampered with, has been proposed (see Japanese Patent Laid-Open No. 9-200730.)

On the other hand, generally, a digital camera has a function of processing an image at the same time of image sensing by image processing utilizing digital data processability. As the content of image processing can be changed in correspondence with a set image processing parameter, various types of image processing can be performed in the digital camera. In a known digital camera of this type, an image processing parameter can be freely set in accordance with a user's preference in addition to image processing parameters corresponding to preset operation modes (see Japanese Patent Laid-Open No. 2005-101828). According to this digital camera, an image processing system capable of realizing a user's desired color reproduction can be provided. In particular, as raw data is digitized from an electric signal obtained from an image sensing device and not subjected to image processing such as white balance processing, a user's desired color reproduction can be easily realized by selectively using an image processing parameter.

The image processing parameter for processing raw data can be set by the user and applied to the raw data. Further, there is a need to prevent such image processing parameter from being used by others, or to limit use of the image processing parameter by the others. However, generally, addition of information on a creator of an image processing parameter to the image processing parameter which is used for performing image processing on raw data obtained by a digital camera is not taken into consideration. Accordingly, the content of image processing parameter unique to the creator cannot be appropriately protected.

SUMMARY OF THE INVENTION

The present invention has been made in view of the above problem, and provides a technique for enabling a user as a creator of an image processing parameter to set limitation of use of the image processing parameter by a third person.

According to one aspect of the present invention, an information processing apparatus for editing an image processing parameter available in image processing by an image sensing apparatus, comprises:

an extraction unit adapted to extract creator information set by a creator of the image processing parameter attached to the image processing parameter;

an edition unit adapted to edit the image processing parameter thereby generate a new image processing parameter; and a limitation unit adapted to limit editing processing of the image processing parameter by the edition unit based on the creator information extracted by the extraction unit.

According to another aspect of the present invention, an image sensing apparatus for performing image processing on photographed data using an image processing parameter, comprises:

an adjustment unit adapted to adjust an image processing characteristic upon image processing using the image processing parameter;

a processing unit adapted to process the photographed data using the image processing parameter adjusted by the adjustment unit;

a display unit adapted to display image data processed by the processing unit; and a limitation unit adapted to limit an adjustable range of the image processing parameter by the adjustment unit based on creator information set by a creator of the image processing parameter attached to the image processing parameter.

According to still another aspect of the present invention, an image processing system comprises:

a download unit adapted to download an image processing parameter via the Internet and store the image processing parameter into a memory unit;

an extraction unit adapted to extract creator information set by a creator of the image processing parameter attached to the image processing parameter;

an edition unit adapted to edit the image processing parameter thereby generate a new image processing parameter, and store the new image processing parameter into the memory unit;

a supply unit adapted to supply the image processing parameter stored in the memory unit to an image sensing apparatus;

a processing unit adapted to perform image processing on photographed data using the image processing parameter supplied by the supply unit in the image sensing apparatus; and a first limitation unit adapted to limit editing processing of the image processing parameter by the edition unit based on the creator information extracted by the extracted unit.

According to yet another aspect of the present invention, an image processing parameter editing method for editing an image processing parameter available in image processing by an image sensing apparatus, comprises:

an extraction step of extracting creator information set by a creator of the image processing parameter attached to the image processing parameter;

an edition step of editing the image processing parameter thereby generating a new image processing parameter; and a limitation step of limiting editing processing of the image processing parameter at the edition step based on the creator information extracted at the extraction step.

According to still another aspect of the present invention, a control method for an image sensing apparatus for performing image processing on photographed data using an image processing parameter, comprises:

an adjustment step of adjusting an image processing characteristic by changing the image processing parameter;

a processing step of processing the photographed data using the image processing parameter adjusted at the adjustment step;

a display step of displaying image data processed at the processing step; and a limitation step of limiting an adjustable range of the image processing parameter at the adjustment step based on creator information set by a creator of the image processing parameter attached to the image processing parameter.

Further features of the present invention will become apparent from the following description of exemplary embodiments (with reference to the attached drawings).

BRIEF DESCRIPTION OF THE DRAWINGS

FIG. 14 is a table showing the data structure of adjustment permission/prohibition information 55c in the image processing parameter setting file.

DESCRIPTION OF THE EMBODIMENTS

Hereinbelow, a preferred embodiment of the present invention will be described with reference to the attached drawings.

Note that in the present specification, information on a creator of image processing parameter, that is, a name of the creator of image processing parameter and information on use limitation will be referred to as "creator information".

Figure 1:
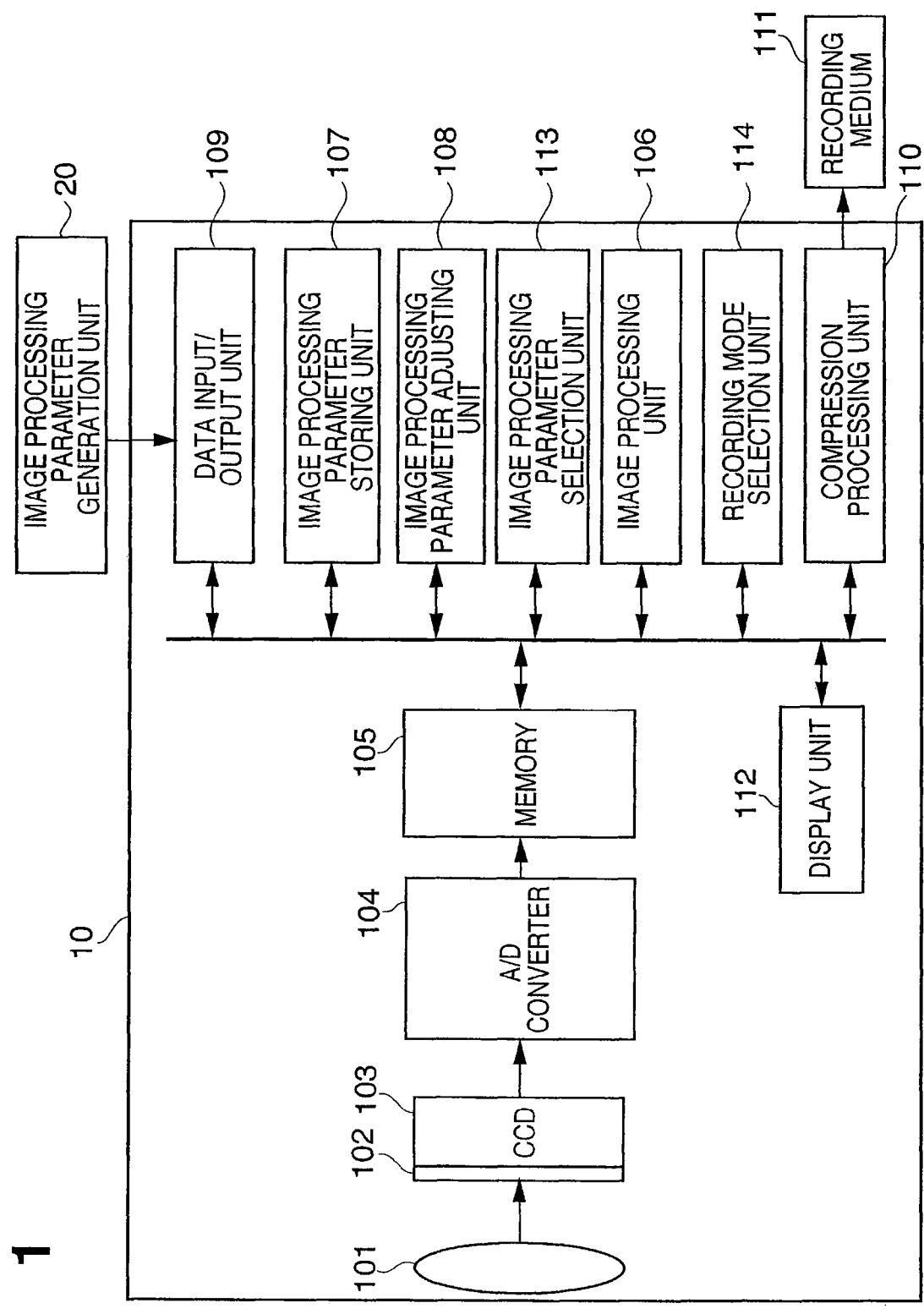
FIG. 1 is a block diagram showing the configuration of an image sensing apparatus as an image processing apparatus according to an embodiment of the present invention.

FIG. 1 is a block diagram showing the configuration of an image processing apparatus according to an embodiment of the present invention. In the present embodiment, a digital camera is employed as the image processing apparatus.

A digital camera 10 has a photographing optical system 101, a color chip filter 102 and an image sensing device 103. In the present embodiment, a CCD is employed as the image sensing device 103, and a color chip filter 102 of, for example, RGB primary colors is provided on an imaging plane of the image sensing device 103. That is, the digital camera 10 according to the present embodiment performs color photographing in a single-plane manner. An optical subject image formed on the imaging plane of the image sensing device 103 by the photographing optical system 101 is photoelectric-converted by the image sensing device 103. A signal obtained by the photoelectric conversion is read from the image sensing device 103, then subjected to analog signal processing and supplied to an A/D converter 104. The A/D converter 104 converts the signal supplied from the image sensing device 103 into a digital signal, and stores the digital signal as raw data into a memory 105.

An image processing unit 106 performs white balance correction processing, color interpolation processing, matrix conversion, gamma processing and the like on the raw data stored in the memory 105, and outputs the result of processing as image data. Upon execution of these processings, the image processing unit 106 uses an image processing parameter held in an image processing parameter storing unit 107. The image processing parameter storing unit 107 holds plural types of image processing parameters. Note that the image processing parameters are held in the image processing parameter storing unit 107 as image processing parameter files having a data structure to be described later with reference to FIG. 6. An image processing parameter selection unit 113 selects an image processing parameter to be used by the image processing unit 106 from the image processing parameter storing unit 107. Further, in the digital camera 10, the selected image processing parameter can be adjusted by an image processing parameter adjusting unit 108 in accordance with necessity.

The image processing parameter storing unit 107 holds image processing parameters previously set upon shipment of the digital camera 10 and image processing parameters input from an external device through a data input/output unit 109. Note that hereinbelow, the image processing parameters previously set and registered upon shipment of the digital camera 10 will be referred to as "preset parameters". Further, the image processing parameters input from an external device will be referred to as "user set parameters". The user set parameters are image processing parameters generated by an external information processing apparatus (image processing parameter generation unit 20 (PC application software)). Further, the user set parameters include parameters distributed and provided on Internet websites by camera makers, professional photographers and the like.

A compression processing unit 110 performs compression processing corresponding to a recording mode selected by a recording mode selection unit 114 on image data. For example, when a raw mode is selected by the recording mode selection unit 114, the compression processing unit 110 performs reversible compression processing such as Huffman coding on raw data. On the other hand, when a JEPG (Joint Picture Experts Group) mode is selected by the recording mode selection unit 114, the compression processing unit 110 performs JPEG compression processing on image data output from the image processing unit 106. The data compression-processed by the compression processing unit 110 is recorded on a recording medium 111. The user can set a desired recording mode by operating the recording mode selection unit 114. Note that in the present specification, data obtained by performing image processing (developing processing) on raw data is referred to as "image data". Further, in the present specification, the raw data, image data and the like obtained by using the digital camera 10 are generally referred to as "photographed data".

Figure 2:
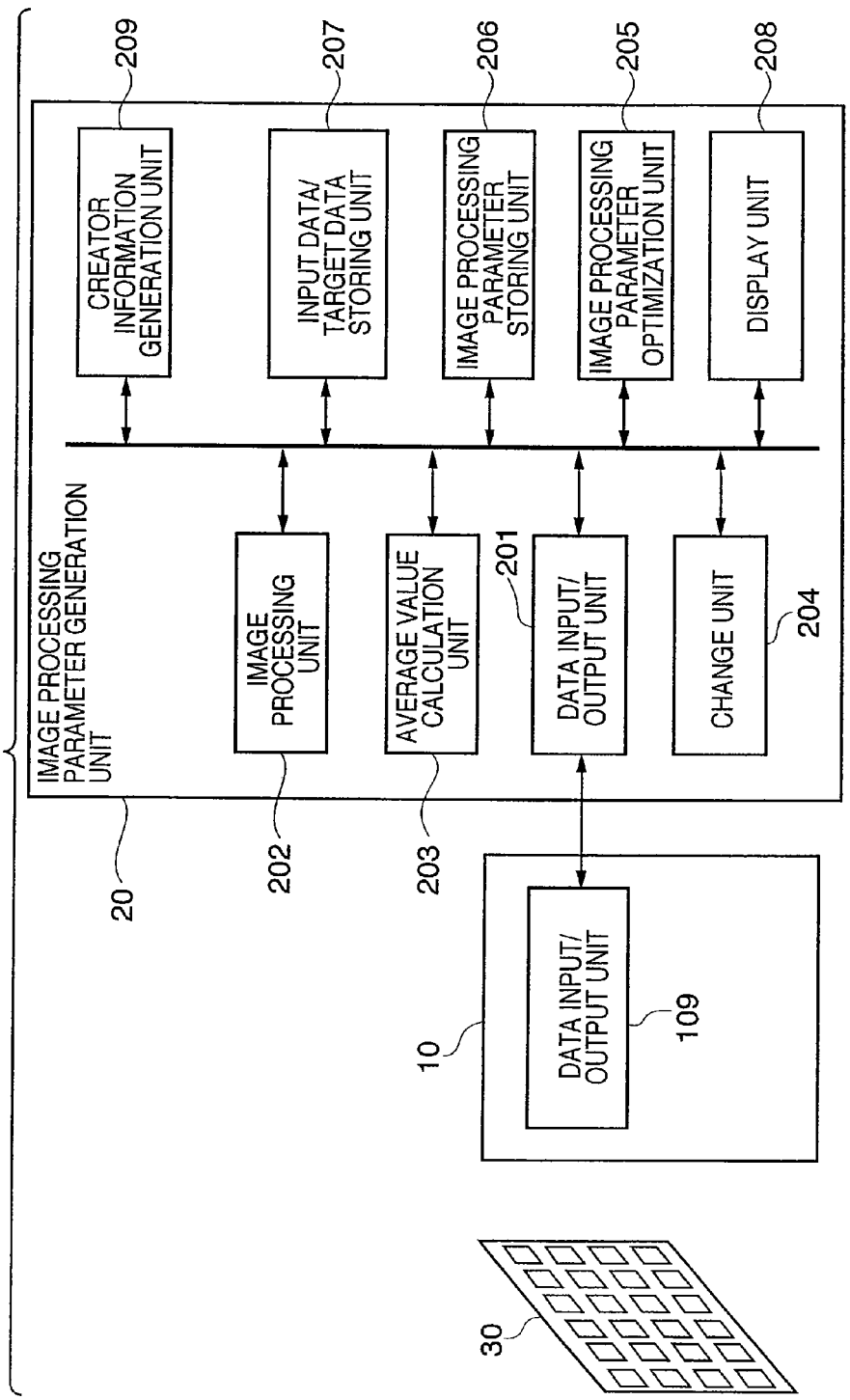
FIG. 2 is a block diagram showing the structure of an image processing parameter generation unit.
Figure 3:
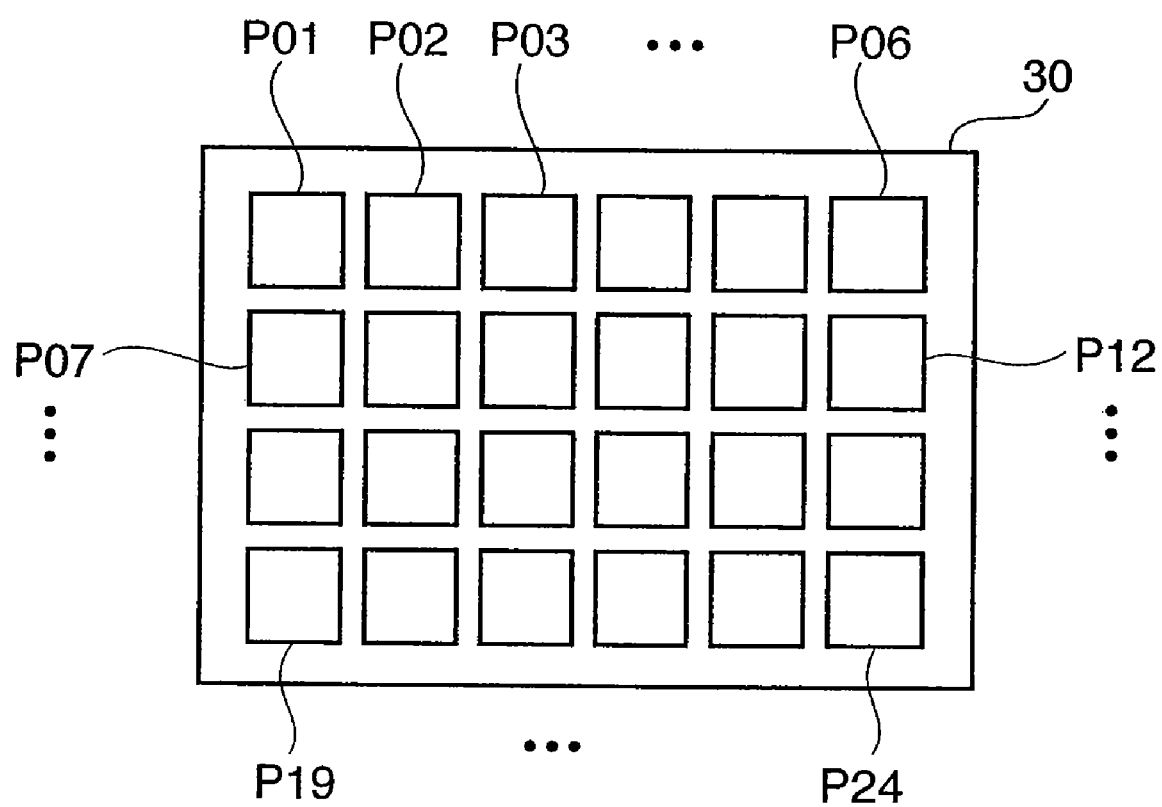
FIG. 3 is an example of a color chart shown in FIG. 2.

Next, the structure of the image processing parameter generation unit 20 will be described using FIG. 2. The image processing parameter generation unit 20 can be realized by installation of a control program for realizing the following functions into, for example, a general-purpose personal computer. The image processing parameter generation unit 20 according to the present embodiment determines an image processing parameter using photographed data of a color chart including plural color patches and target colors (target data) designated for respective color patches of the color chart. The image processing parameter generation unit 20 inputs photographed data from the digital camera 10 via the data input/output unit 201. For example, raw data (reversible-compressed) obtained by image sensing of a color chart 30 by the digital camera 10 is input into the image processing parameter generation unit 20 via the data input/output unit 201. As shown in FIG. 3, 24 color patches P01 to P24 in 24 colors for the purpose of determination, analysis or the like of color reproducibility are arrayed in the color chart 30 according to the present embodiment. For example, like ColorChecker (Gretag-Macbeth Holding AG), the color chart 30 includes color patches covering all the color hues and gray tones. Note that the color chart 30 according to the present embodiment has 24 color patches P01 to P24, however, the number of color patches is not limited to this number. It may be arranged such that color patches corresponding to various combinations of color hues and tones are arrayed in the color chart 30.

The data input/output unit 201 of the image processing parameter generation unit 20 transmits/receives photographed data and image processing parameters by communication with the digital camera 10. More particularly, the data input/output unit 201 performs communication with the digital camera 10 via the data input/output unit 109 of the digital camera 10. In communication between the data input/output unit 109 and the data input/output unit 201, USB or the like is employed. Further, the data input/output unit 201 realizes input of target data from the external device or the like via a PC application and reception of image processing parameters via the Internet or the like. Note that the target data means a color target value used for generation of image processing parameter to realize a desired image processing characteristic in the digital camera 10 by the image processing parameter generation unit 20. The input of target data will be described in detail later in the explanation of step S206 in FIG. 7. Further, the data input/output unit 201 further has a function as an input device such as a keyboard, a mouse and the like to receive the user's input.

An image processing unit 202 refers to image processing parameters associated to the currently-selected digital camera 10, from the image processing parameters stored in the image processing parameter storing unit 206 to be described later. Then, the image processing unit 202 performs image processing equivalent to those in the currently-selected digital camera 10 on an RGB average value of raw data by color patch output by an average value calculation unit 203 thereby generates image data. That is, the image processing unit 202 is capable of performing image processings equivalent to those by the image processing unit 106 in each of the plural digital cameras, and selectively performs image processings equivalent to those by the image processing unit 106 of the selected digital camera. Note that selection of a digital camera may be performed by the user's designating a desired digital camera from a list of digital cameras displayed on a display unit 208, or may be performed by acquisition of model information from a currently-connected digital camera via the data input/output unit 201.

Next, an example of particular processing by the image processing unit 202 will be described using FIG. 4.

Figure 4:
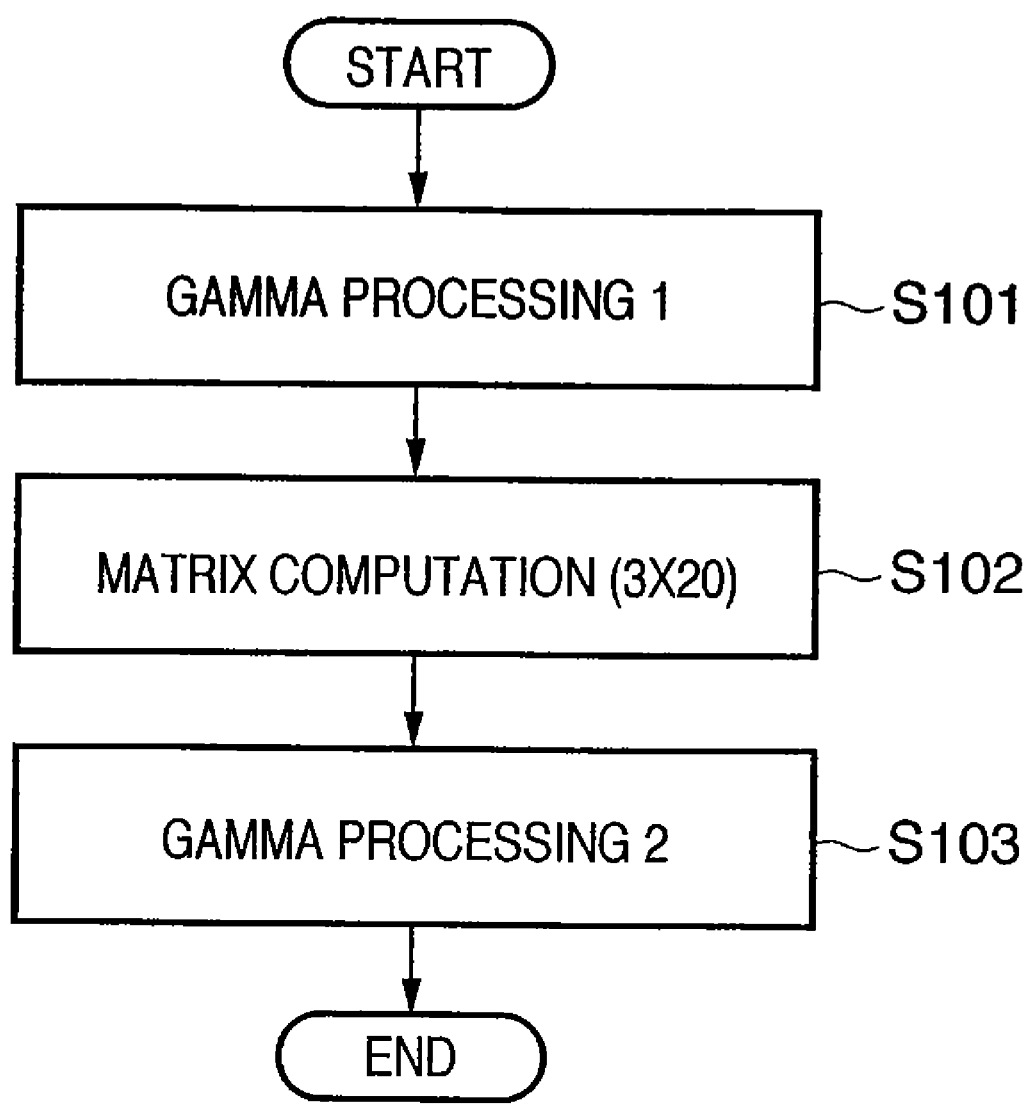
FIG. 4 is a flowchart showing an example of image processing performed by an image processing unit according to the embodiment.

FIG. 4 is a flowchart showing an example of image processing performed by the image processing unit 202. At steps S101 to S103, gamma conversion 1, 3×20 matrix computation and gamma conversion 2 are performed on raw data. The gamma conversion 1 is, for example, linear gamma conversion processing. The matrix computation is matrixing using an X×Y matrix, that is, an X row Y column filter. In step S102, matrix computation using a 3×20 filter is performed. The gamma conversion 2 is, for example, gamma conversion processing corresponding to a gamma curve. The contents of the processings at the above steps (the conversion tables in the gamma conversion 1 and the gamma conversion 2, and the matrix used in the matrix computation) are determined in accordance with the selected image processing parameter.

Returning to FIG. 2, the average value calculation unit 203 calculates respective RGB average values of the patches P01 to P24 from the raw data of the color chart 30 as shown in FIG. 3 input from the data input/output unit 201. Note that format information of the color chart 30 (arrayed positions of the respective color patches and the like) is previously held in an input data/target data storing unit 207. The average value calculation unit 203 automatically extracts pixel data of the respective color patches using the format information, and calculates RGB average values. Note that in the present embodiment, the image processing unit 202 performs the image processings as above-described in the flowchart of FIG. 4 on the RGB average values of the respective color patches output from the average value calculation unit 203, and further, converts the processed values to CIELAB data. Hereinbelow, the converted data will be referred to as "input patch data".

Figure 5:
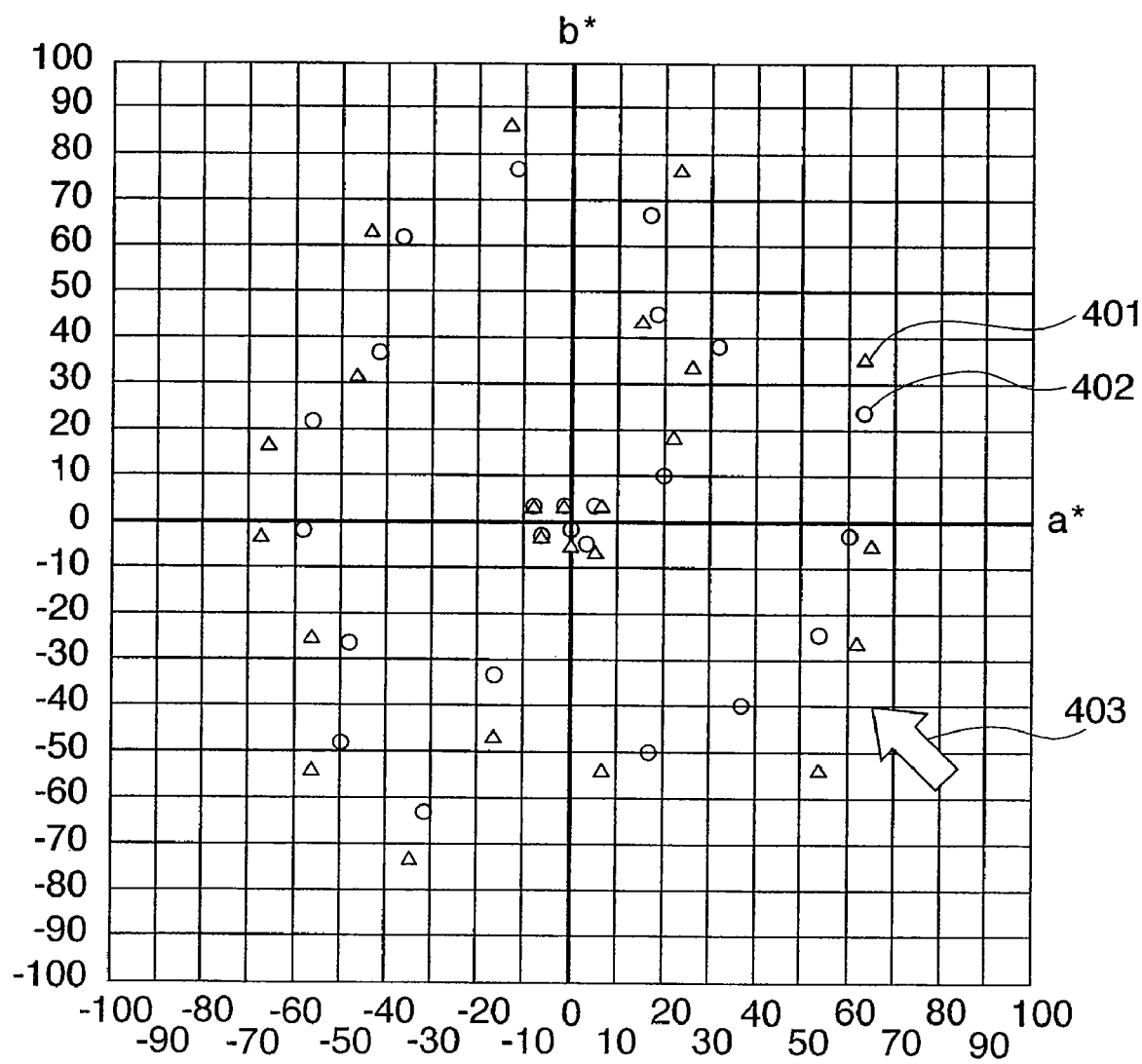
FIG. 5 is an example of a display of a target data change screen displayed by a change unit on a display unit according to the embodiment.

A change unit 204 displays, a target data change screen as shown in FIG. 5, in which input patch data input from the image processing unit 202 and target data are plotted on a CIELAB color space a*b* plane, on the display unit 208. The target data change screen functions as a GUI, such that the user can adjust target data value to obtain a desired color on the screen. Further, when the user changes the target data on the target data change screen, the change unit 204 reflects the change in the target data.

FIG. 5 is an example of the target data change screen displayed by the change unit 204 on the display unit 208. As shown in FIG. 5, symbols "○" on the a*b* plane indicate the input patch data of each of the color patches P01 to P24, and symbols "Δ", the target data. By using the displayed screen, the shift between the input patch data and the target data in each color patch can be checked. For example, as shown in FIG. 5, in some color patch, when target data 401 is positioned in a different position from that of input patch data 402, the user can change the position of the target data 401 using a pointer 403. For example, the target data 401 can be moved to a desired position on the a*b* plane by moving the pointer 403 to the display position of the target data 401 and by performing a drag-and-drop operation. In this manner, as the change unit 204 provides a GUI such that the position of target data can be changed by using the pointer 403, the user can visually change the LAB values of the target data on the target data change screen. Note that the pointer 403 is an arrow which can be moved in correspondence with movement of, for example, a mouse of the data input/output unit 201.

Note that in the present embodiment, the input patch data and the target data are mapped on the CIELAB color space a*b* plane, however, the color space plane is not limited to the a*b* plane. For example, the input patch data and the target data may be mapped on CIELAB color space L*a*plane or L*b* plane, or may be mapped on other type of color space plane.

Returning to FIG. 2, an image processing parameter optimization unit 205 optimizes the image processing parameter used in the image processing unit 202. For example, the image processing parameter optimization unit 205 optimizes the image processing parameter using the DLS (Damped Least Square) method or the like such that the color difference between the above-described input patch data of each of the color patches P01 to P24 and the changed target data becomes a minimum.

The input data/target data storing unit 207 holds RGB average values as sources of the above input patch data, calculated by the average value calculation unit 203 for the respective color patches P01 to P24, as input RGB data, and holds target data set by the user. The display unit 208 displays image data, obtained by color image processings by the image processing unit 202 on photographed data read from the data input/output unit 201, and the like. Note that the display unit 208 has a display device such as a CRT or a liquid crystal display. Further, as such display device, a device capable of appropriate color reproduction in conformance with a color management system or the like, is preferable.

Figure 6:
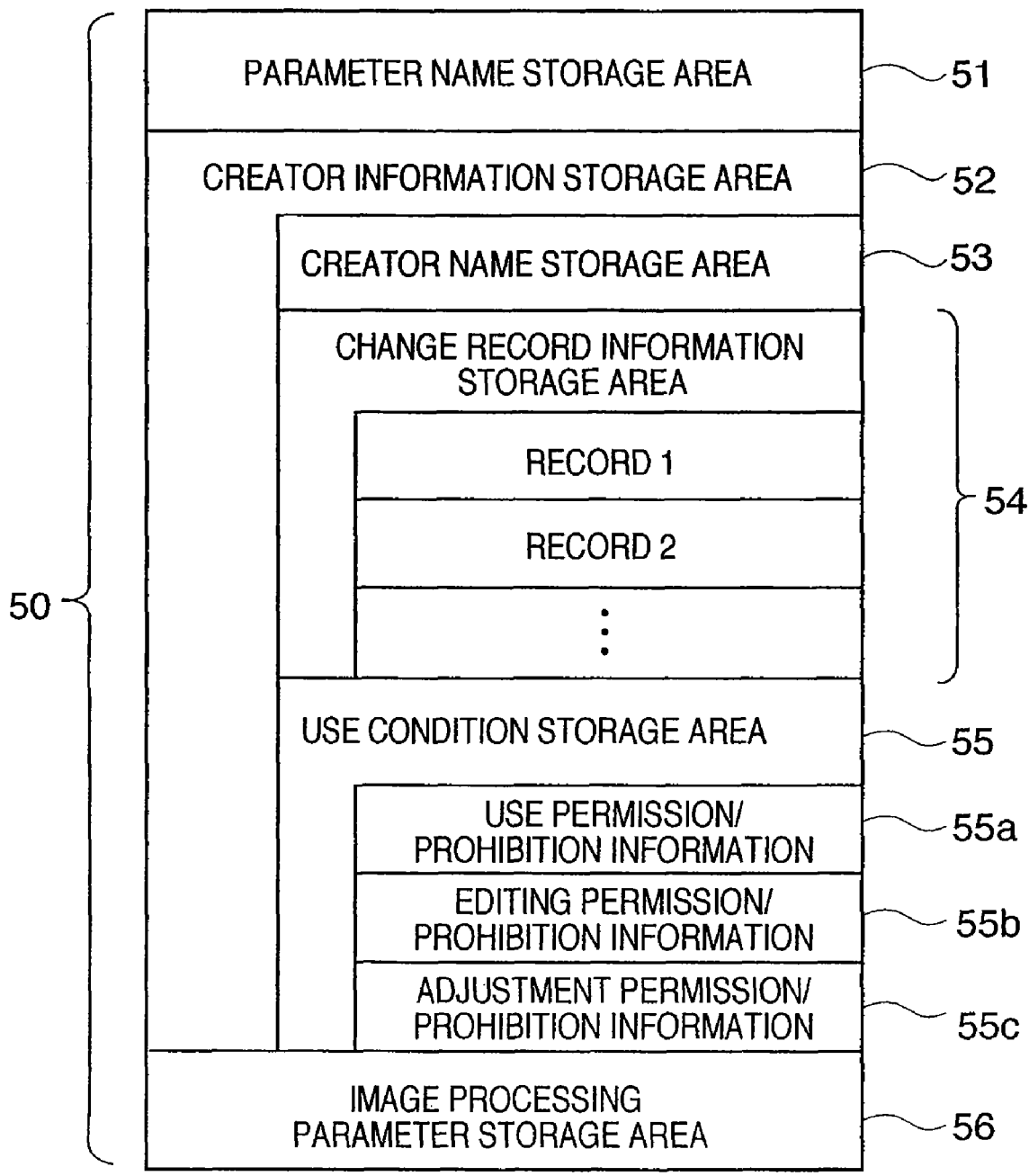
FIG. 6 is a table showing an example of data structure of an image processing parameter setting file according to the embodiment.

A creator information generation unit 209 generates copyright information or the like of a creator who created the image processing parameter (e.g. an image processing parameters optimized by the image processing parameter optimization unit 205), and adds the information to the image processing parameter. Hereinbelow, the information will be referred to as "creator information". FIG. 6 is a table showing an example of data structure of an image processing parameter setting file 50 generated by the image processing parameter generation unit 20. A parameter name storage area 51 is an area for storing a character storing indicating a characteristic of the image processing parameter created by the user, a photographed scene, and a theme or the like of subject (e.g., "clear skin"). In a creator information storage area 52, information on the creator of the image processing parameter is stored. The creator information storage area 52 includes a creator name storage area 53, a change record information storage area 54, and a use condition storage area 55. In the creator name storage area 53, a name of the creator of the image processing parameter is stored. In the change record information storage area 54, a change record indicating the progress of the creation of the image processing parameter is stored. In the use condition storage area 55, information on use condition(s) of the image processing parameter is stored. In an image processing parameter name storage area 56, the image processing parameter is stored.

Note that in the use condition storage area 55, for example, use permission/prohibition information 55a, editing permission/prohibition information 55b, and adjustment permission/prohibition information 55c are stored. The use permission/prohibition information 55a indicates whether or not use of the image processing parameter by a third person other than the creator is permitted. The editing permission/prohibition information 55b specifies limitation on editing of the image processing parameter by the third person. Further, the adjustment permission/prohibition information 55c, having a structure as shown in FIG. 14, specifies limitation on adjustability/nonadjustability and information on adjustable range for respective adjustment items of the image processing parameter. In this manner, the creator information is used as information to limit use of the image processing parameter.

Figure 7:
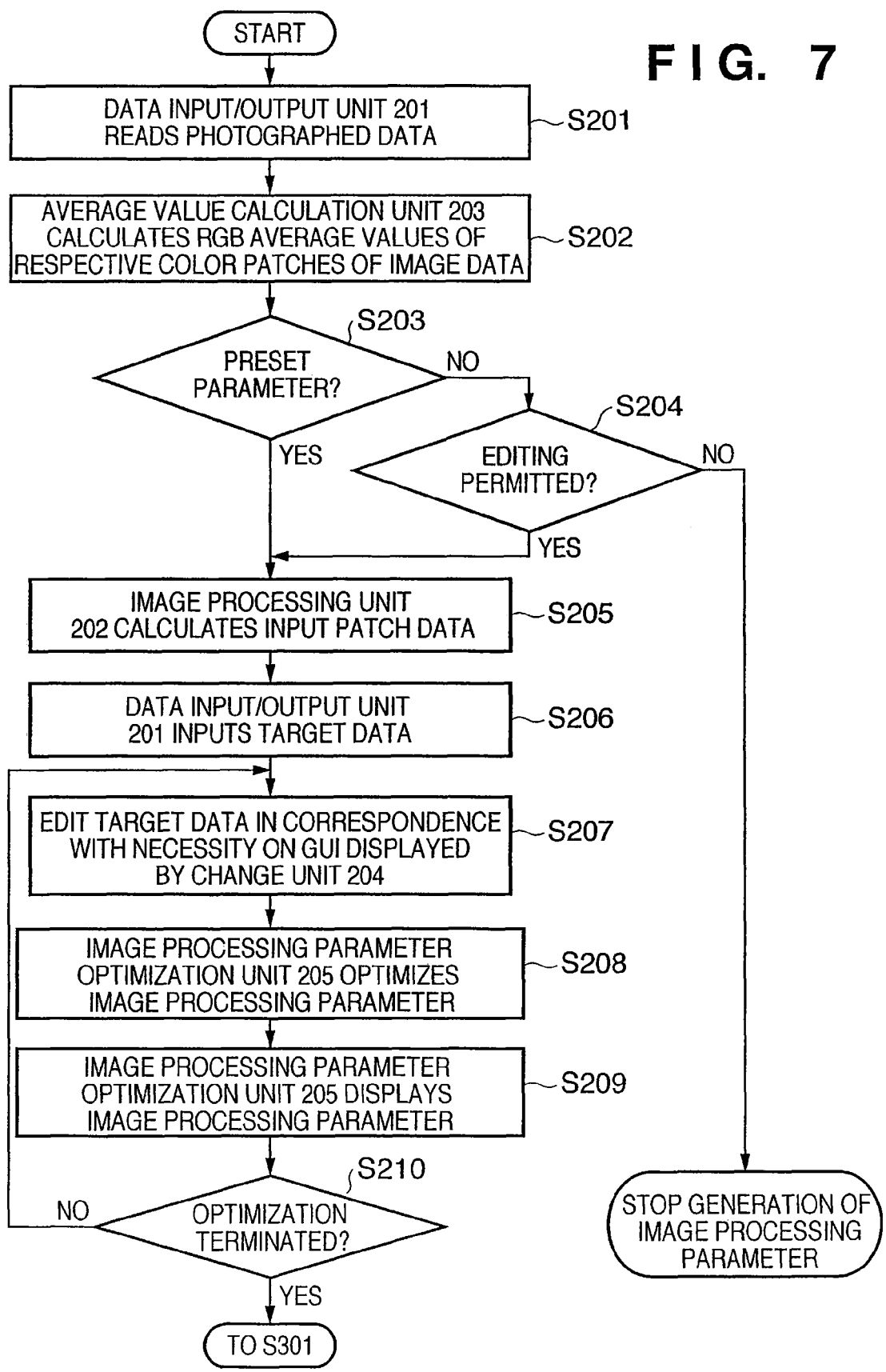
FIG. 7 is a flowchart showing image processing parameter generation processing by the image processing parameter generation unit.

Next, image processing parameter generation processing by the image processing parameter generation unit 20 will be particularly described using FIG. 7.

First, in step S201, the data input/output unit 201 reads photographed data from the digital camera 10 via the data input/output unit 109. Note that in the present embodiment, the raw data of the color chart 30 is read. Next, in step S202, the average value calculation unit 203 obtains respective RGB values of the color patches P01 to P24 of the raw data read by the data input/output unit 201. Next, in step S203, the image processing unit 202 determines whether the image processing parameter selected by the user (or image processing parameter attached to the raw data) to be referred by the image processing unit 202 is a preset parameter or a user set parameter.

When it is determined that the image processing parameter is a user set parameter, the process proceeds from step S203 to step S204. In step S204, the image processing unit 202 determines whether or not the image processing parameter can be edited based on the editing permission/prohibition information 55b. When it is determined that the image processing parameter cannot be edited, the image processing parameter generation processing is stopped. When it is determined, in step S204, that the image processing parameter can be edited, the process proceeds to step S205. In step S205, the image processing unit 202 performs image processing on the RGB average values calculated by the average value calculation unit 203 using the image processing parameter selected by the user to be referred by the image processing unit 202. Further, on the assumption that the color-processed RGB data (Hereinbelow, referred to as "color processed data") is "sRGB" defined in the IEC61966-2-1 and the white color point, "D65", the image processing unit 202 calculates input patch data for the change unit 204 in the CIELAB format. Note that IEC means International Electrotechnical Commission. In the image processing unit 202, the image processing parameter attached to the raw data may be used in place of the image processing parameter selected by the user for reference by the image processing unit 202. Further, it may be arranged such that in step S204, predetermined authentication is performed; thereby it is determined whether or not the image processing parameter can be edited. The predetermined authentication is performed by, for example, registering authentication information such as ID or password into the creator name storage area 53 and inputting the authentication information from the image processing parameter generation unit 20 (information processing apparatus).

Next, in step S206, target data for the color patches P01 to P24 of the color chart 30 photographed by the digital camera 10 are input into the image processing parameter generation unit 20. Otherwise, CIELAB format color data, obtained by performing colorimetry on the respective color patches of the color chart 30 using a compact spectrophotometer by Gretag-Macbeth Holding AG or the like, may be input as the target data. Note that the data format of the target data according to the present embodiment is similar to that of the above-described input patch data (CIELAB format). The target data may be input from the target data change screen shown in FIG. 5 via a PC application, or may be input as a data file. Further, the target data may be the same data as the previously calculated input patch data, or the input patch data may be changed on the target data change screen.

Next, in step S207, the change unit 204 displays the input patch data calculated by the image processing unit 202 in step S205 and the target data input by the data input/output unit 201 in step S206 on the display unit 208. At this time, the change unit 204 displays a target data change screen as shown in FIG. 5 on the display unit 208. The change unit 204 receives the user's target data editing operation (moving of the symbol "Δ" in FIG. 5). Then, the LAB value in the edited (moved) symbol "Δ" position is determined as target data after the editing. At this time, the user can adjust the target data in accordance with his/her preference by, for example, increasing red tint of target data indicating a flesh color or increasing blue tint of target data indicating sky blue.

Next, in step S208, the image processing parameter optimization unit 205 performs optimization processing on the color processing parameter in correspondence with the color difference between the input patch data and the edited target data. More particularly, the image processing parameter optimization unit 205 performs similar processings to those by the image processing unit 202 using the image processing parameter on the respective color patch data and calculates color processed data ($R_i$, $G_i$, $B_i$)(i=1 to 24). "i" is an identification number (ID) of the respective color patches P01 to P24. Next, a color difference $E_i$ between data ($L^*_i$, $a^*_i$, $b^*_i$) obtained by converting the color processed data into CIELAB color space data and the target data ($L^*_{Ti}$, $a^*_{Ti}$, $b^*_{Ti}$) is set as an evaluation function. Then, the values of the evaluation functions $E_i$ in the all the color patches are added, and the value of the total evaluation function E is calculated based on the following expression.

$$E = \sum_1 E_i \quad \text{[Expression 1]}$$
$$= \sum_1 \sqrt{(L^*_{Ti} - L^*_i)^2 + (a^*_{Ti} - a^*_i)^2 + (b^*_{Ti} - b^*_i)^2}$$

Next, the image processing parameter optimization unit 205 optimizes the image processing parameter such that the entire color difference $E_i$ between the image processed data ($L^*_i$, $a^*_i$, $b^*_i$) of the respective color patches and the target data ($L^*_{Ti}$, $a^*_{Ti}$, $b^*_{Ti}$) becomes a minimum value. As the optimization, the DLS (Damped Least Square) method or the like may be employed. That is, the image processing parameter optimization unit 205 obtains an image processing parameter where the value of the evaluation function E in the expression 1 is a minimum value, thereby optimizing the image processing parameter. Further, the evaluation function utilized by the image processing parameter optimization unit 205 is not limited to the evaluation function E obtained by the above-described expression 1, but an evaluation function E obtained by further setting a weight value individually for the respective color patches P01 to P24 may be employed. Assuming that the weight value at that time is $w_i$, the image processing parameter optimization unit 205 calculates the value of the evaluation function E based on the following expression.

$$E = \sum_1 w_i E_i \quad \text{[Expression 2]}$$
$$= \sum_1 w_i \sqrt{(L^*_{Ti} - L^*_i)^2 + (a^*_{Ti} - a^*_i)^2 + (b^*_{Ti} - b^*_i)^2}$$

Figure 8:
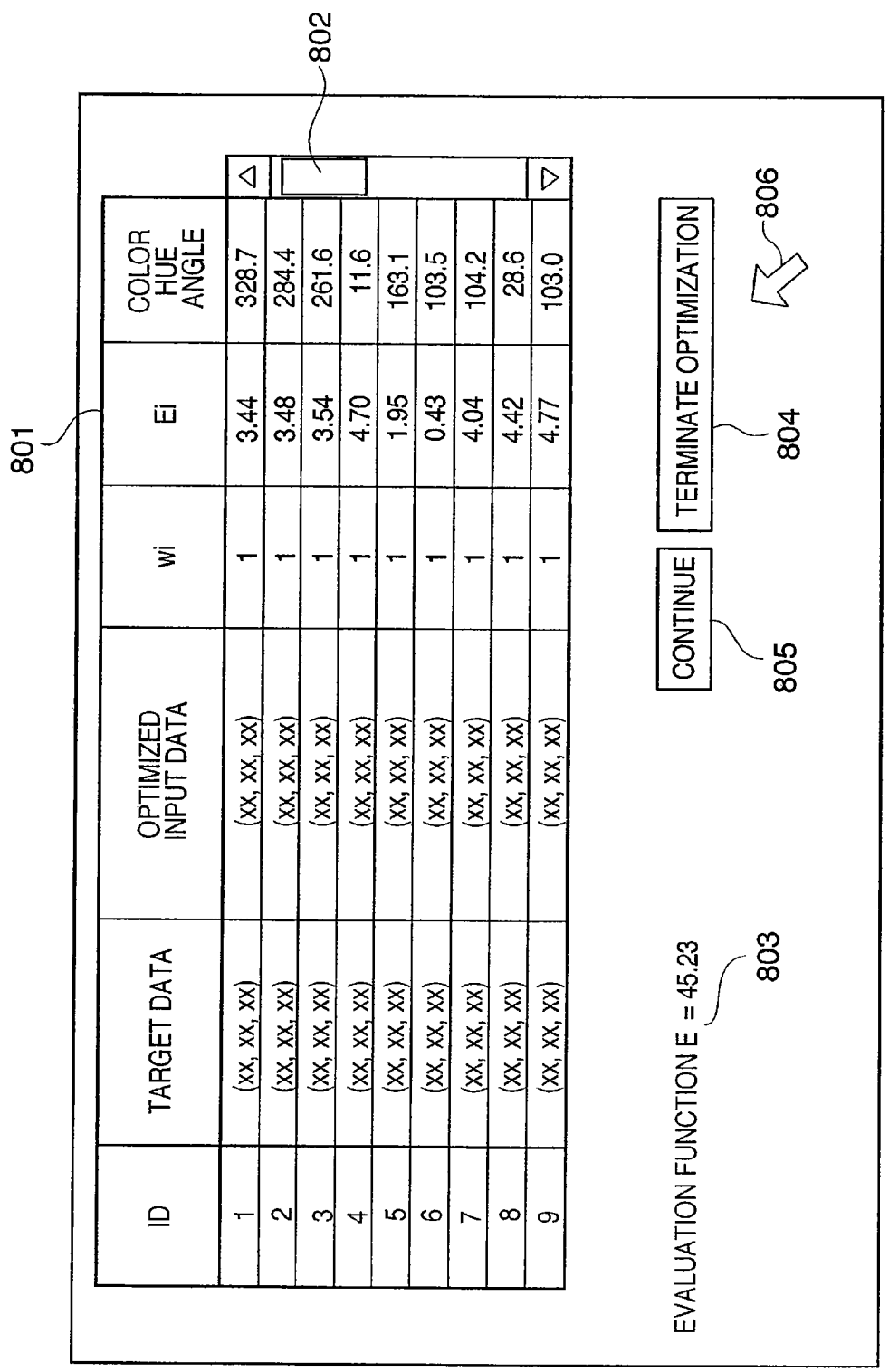
FIG. 8 is an example of display of a list of input patch data, target data and color differences therebetween in image processing regarding color patches P01 to P24 utilizing an optimized image processing parameter.

Next, in step S209, the image processing parameter optimization unit 205 displays the values of the evaluation functions $E_i$ for the respective color patches and the value of the evaluation function E as a total value in the form of list as shown in FIG. 8 on the display unit 208. Further, the image processing unit 202 performs image processings on the photographed data using the image processing parameter optimized by the image processing parameter optimization unit 205. Thus the image processing parameter generation unit 20 displays an image after the image processing (image of the color chart 30) on the display unit 208.

By the above processing, the user can check the color difference between the input data and the target data in the case of image processing utilizing the optimized image processing parameter in the respective color patches, with a list display 801 shown in FIG. 8. Further, the user can check whether or not the respective color patches are reproduced in desired colors from the image display. In the list display 801 according to the present embodiment, the target data, input data obtained by processing on the raw data using the optimized image processing parameter (hereinbelow, "optimized input data") the weight value $w_i$, the evaluation function $E_i$ and a hue angle (color difference) for the respective color patches are displayed in the form of list in the order of ID. Further, the value of the evaluation function E is displayed (803). Further, in the display example in FIG. 8, a scroll bar 802 is provided to, when the data on all the 24 color patches cannot be displayed in the form of list at once, to scroll the list. As shown in FIG. 8, the user can easily determine whether or not sufficient optimization has been performed so as to obtain an image processing parameter corresponding to the target data by checking the display on the display unit 208.

Next, the user checks a list display 801 and the image of the color chart 30 displayed on the display unit 208 in step S209, thereby determines whether or not the optimization is to be terminated, and instructs the image processing parameter generation unit 20 to continue or terminate the optimization. The instruction to terminate/continue the optimization is made by selecting an optimization end button 804 or a continue button 805 using the pointer 806. In step S210, the image processing parameter generation unit 20 determines continuation or termination of the optimization in correspondence with the instruction. When the user has given the instruction to continue the optimization (NO at step S210), the process returns to step S207, and a screen prompting the user to edit the target data is displayed. When the user has given the instruction to terminate the optimization (YES at step S210), the process proceeds to step S301 in FIG. 10. Note that the instruction from the user (pointer operation) is input from, for example, the data input/output unit 201.

Next, processing upon addition of creator information to the image processing parameter generated by the processing in steps S201 to S210 will be described using FIGS. 9 and 10.

Figure 9:
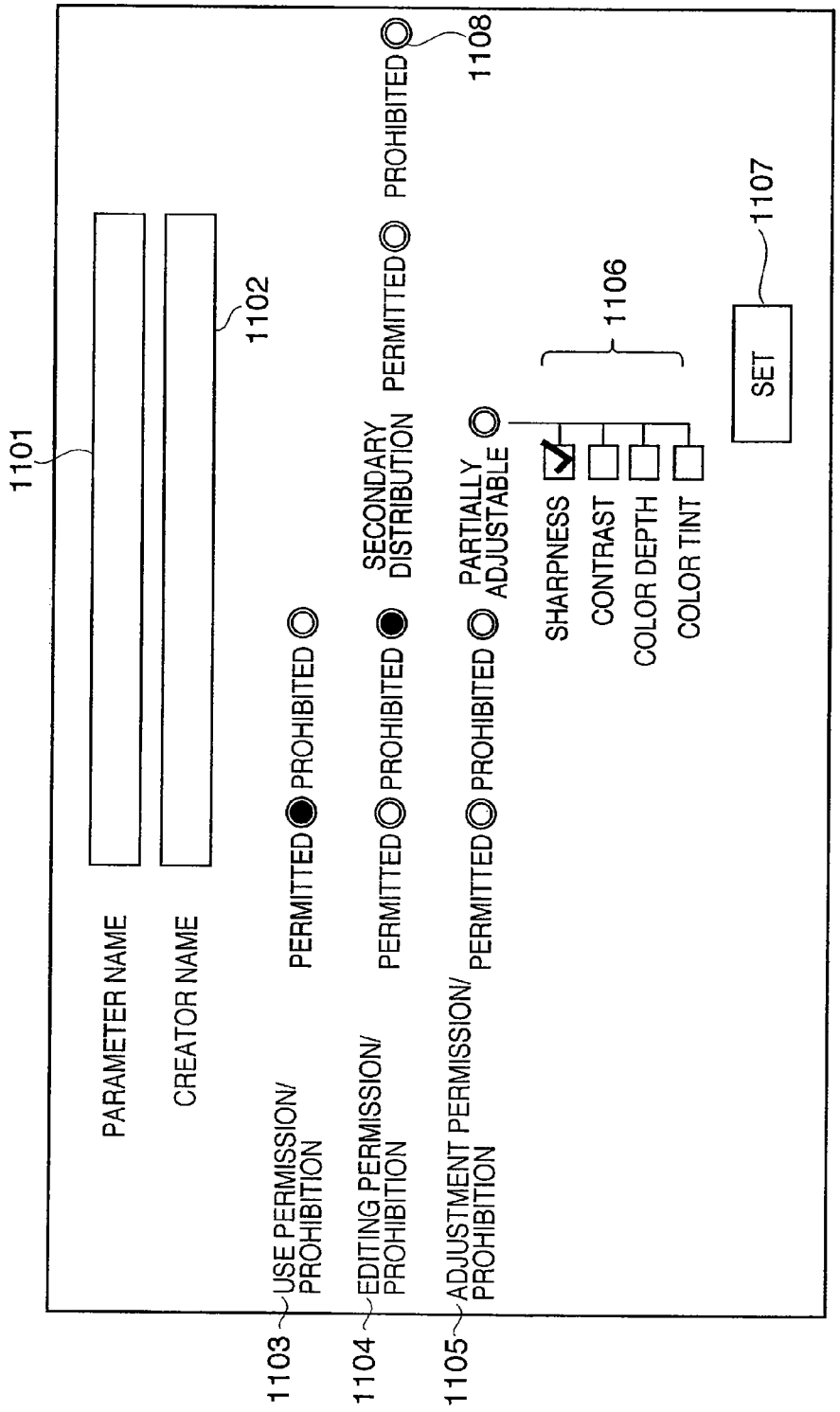
FIG. 9 is an example of a user interface for setting image processing parameter creator information.

The creator information generation unit 209 first displays a user interface as shown in FIG. 9 on the display unit 208, to prompt the user to set image processing parameter creator information. The user can input a name of the image processing parameter in a field 1101, and a name of the creator of the image processing parameter in a field 1102. This information is stored into the parameter name storage area 51 and the creator name storage area 53 of the image processing parameter file. Further, in FIG. 9, interfaces (1103, 1104 and 1105) for use permission/prohibition setting, editing permission/prohibition setting and adjustment permission/prohibition setting are provided. Regarding the editing permission/prohibition setting (1104), an interface 1108 for secondary distribution permission/prohibition setting is further provided. Further, regarding the adjustment permission/prohibition setting, a "partially adjustment permitted" for selecting an adjustable item can be selectable. In the present embodiment, when "partially adjustment permitted" to enable selection of adjustable item is selected in the adjustment permission/prohibition setting, a desired item (plural items can be set) can be selected as an adjustable item (1106) from "sharpness", "contrast", "color depth" and "color tint". In the user interface shown in FIG. 9, when the respective items related to the creator and use limitation have been set and a "set" button 1107 has been depressed (clicked), processing shown in the flowchart of FIG. 10 is started.

Figure 10:
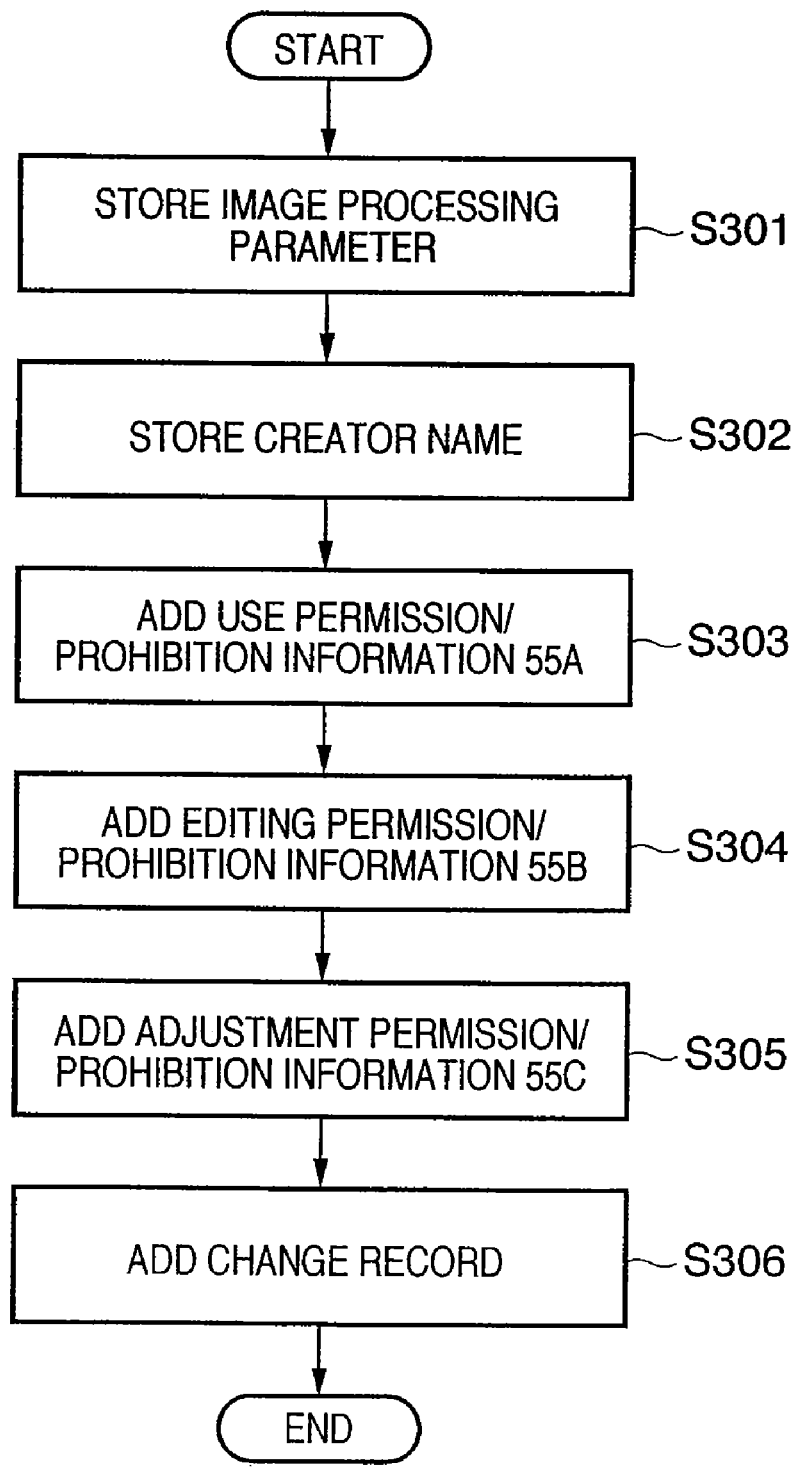
FIG. 10 is a flowchart showing processing of adding the creator information to an image processing parameter.

FIG. 10 is a flowchart showing processing of setting the creator information set using the user interface in FIG. 9 in a generated image processing parameter. First, in step S301, regarding the generated image processing parameter, the name set in the field 1101 is stored in the parameter storage area 51. As a parameter name, a name representing the characteristic of the image processing parameter such as "clear skin" or "bright sky" is preferably set. Next, in step S302, the name of the creator of the image processing parameter (the content set in the field 1102) is stored in the creator name storage area 53.

In step S303, the use permission/prohibition information 55a is added in accordance with the status of the use permission/prohibition setting (1103). The use permission/prohibition information 55a is information indicating whether or not use of the generated image processing parameter by a third person is permitted. Next, in step S304, the editing permission/prohibition information 55b is added in accordance with the status of the editing permission/prohibition setting (1104). The editing permission/prohibition information 55b is information indicating whether or not generation of a new image processing parameter based on the generated image processing parameter is permitted. Further, when editing is permitted, the secondary distribution permission/prohibition setting (1108) is also registered as the editing permission/prohibition information 55b. The secondary distribution means a third person's acquisition of the generated image processing parameter by downloading or the like, and editing or processing the image processing parameter and then distributing the image processing parameter or distributing the image processing parameter without any editing/processing. Next, in step S305, the adjustment permission/prohibition information 55c is added in accordance with the status of the adjustment permission/prohibition setting (1105). The adjustment permission/prohibition information 55c is information indicating whether or not fine adjustment is permitted upon use of the image processing parameter when registered in the digital camera 10. The fine adjustment items are sharpness, contrast, color depth, color tint and the like. Note that when the above-described "partially adjustable" is set, the information of adjustable items shown in FIG. 14 is also registered as the adjustment permission/prohibition information 55c.

Note that in the "partially adjustment permitted" setting, the number (type(s)) of adjustment items is limited, however, it may be arranged such that information to limit the range of the respective adjustment items is set in the adjustment permission/prohibition information 55c. In this case, a user interface to set an adjustment range is provided for, for example, the respective adjustment items denoted by numeral 1106 in FIG. 9. As a particular example, regarding each adjustment item, the adjustment range can be set from +2, +1.0, −1 to −2. Note that the types of setting permitted adjustment items depends on the functions of the image processing unit 106 of the digital camera 10. Similarly, the setting of adjustment range depends on an image adjustment function of the image processing unit 106 of the digital camera 10. For example, when the image processing unit 106 can be adjusted in 10 levels, the adjustment range can be set from +5 to −5.

For example, it may be arranged such that, in the case of a preset parameter, no limitation is posed on the adjustment items such as sharpness, contrast, color depth and color tint, and regarding the adjustment range, a maximum adjustment width is set as long as an output image is not damaged. In this case, the user can freely select an image processing parameter. On the other hand, it may be arranged such that, in the case of a user set parameter, to avoid acquisition of an output image not intended by the creator of the parameter by the user's adjustment, the adjustment items and the adjustment range are limited. For example, in a user set parameter having characteristics in chromaticness and color hues in representation of sky, flesh colors or the like, adjustment of color depth and color tint is prohibited, or adjustment range thereof is limited, but normal adjustment freedom is applied to the other adjustment items. Further, in a user set parameter having a characteristic in tonality, adjustment of contrast is prohibited or adjustment range thereof is limited, but normal adjustment freedom is applied to the other adjustment items.

As described above, limitation can be posed on setting and change of a part or all of the adjustment items of an image processing parameter in correspondence with creator information. In this arrangement, generation of an image different from the intention of the creator of image processing parameter can be prevented while setting freedom for a user is applied to the image processing parameter.

By setting of the use permission/prohibition, the editing permission/prohibition and adjustment permission/prohibition (limitation of partial adjustment permission, limitation of adjustment range) as described above, an image processing parameter can be appropriately protected. For example, regarding image processing parameters distributed by professional photographers and camera makers on the Web, the "editing permission/prohibition" setting is set to "prohibited", and further, in order to enable only fine adjustment as long as adjustment different from the creator's intention is avoided, limitation is posed on the adjustment items and adjustment items using the "adjustment permission/prohibition" setting.

Next, in step S306, a change record of the image processing parameter is added. When the image processing parameter used in generation of input patch data in the image processing unit 202 is a preset parameter, or a user set parameter in which editing by a third person is permitted and the creator of the parameter has abandoned his/her copyright, information on date of generation (change) of the parameter by the user, the contents of the change (changed item(s) of the parameter) and the like is additionally recorded or overwritten in a "record 1" area. In the image processing parameter used in generation of input patch data in the image processing unit 202, when secondary distribution is prohibited in the editing permission/prohibition information, the information on the date of generation (change) of the parameter by the user, the contents of the change (changed items of the parameter) and the like initially stored in the "record 1" area is held, and the information on the date of generation, the contents of change and the like is recorded in a "record 2" and the subsequent areas. By the above processing, creator information is attached to the image processing parameter.

Note that in the above description, an image processing parameter is generated or edited using an image processing parameter included in photographed data (raw data) read from the digital camera 10 at step S201, however, the editing and generation of image processing parameter is not limited to the above arrangement. It may be arranged such that a new parameter is generated using an image processing parameter previously registered in the image processing parameter generation unit 20 (information processing apparatus).

Next, an operation of the digital camera 10 shown in FIG. 1 will be described. Note that the digital camera 10 receives an image processing parameter file, generated by the image processing parameter generation unit 20 as described above, from the image processing parameter generation unit 20 via the data input/output unit 109. The received image processing parameter file is stored in the image processing parameter storing unit 107.

When photography is performed using the digital camera 10, a user turns a power source switch (not shown) on. Then the digital camera 10 is started, image sensing is performed by the image sensing device 103, and raw data is stored into the memory 105. The image processing unit 106 reads a currently-selected image processing parameter from the image processing parameter storing unit 107. Then the image processing unit 106 generates a display image by performing image processing on the raw data stored in the memory 105, and displays the image on the display unit 112. Note that the display of photographed data on the display unit 112 is updated every, for example, ⅓₀sec. Accordingly, in this case, the generation of display image by the image processing unit 106 from raw data is performed every ⅓₀sec.

Next, the user checks the image displayed on the display unit 112 and determines the picture composition of a subject, depresses a shutter button (not shown) thereby performing photography. When the shutter button is depressed, the image processing unit 106 performs image processing on raw data using the read image processing parameter and outputs image data. The compression processing unit 110 performs compression processing on photographed data (raw data or the above-described image data), output at the timing of depression of the shutter button, in correspondence with a recording mode selected by the recording mode selection unit 114, and records the compression-processed data onto the external recording medium 111.

Note that when the image processing parameter currently selected in the digital camera 10 is a user set parameter, use of the image processing parameter is limited in correspondence with the creator information of the image processing parameter. For example, when the use permission/prohibition information 55a indicates prohibition of use by a third person, the third person cannot use the parameter in the processing by the image processing unit 106. Otherwise, the adjustment items of the image processing parameter are limited in accordance with the creator information. As described above, the adjustment items of an image processing parameter are sharpness, contrast, color depth, color tint and the like.

Figure 11:
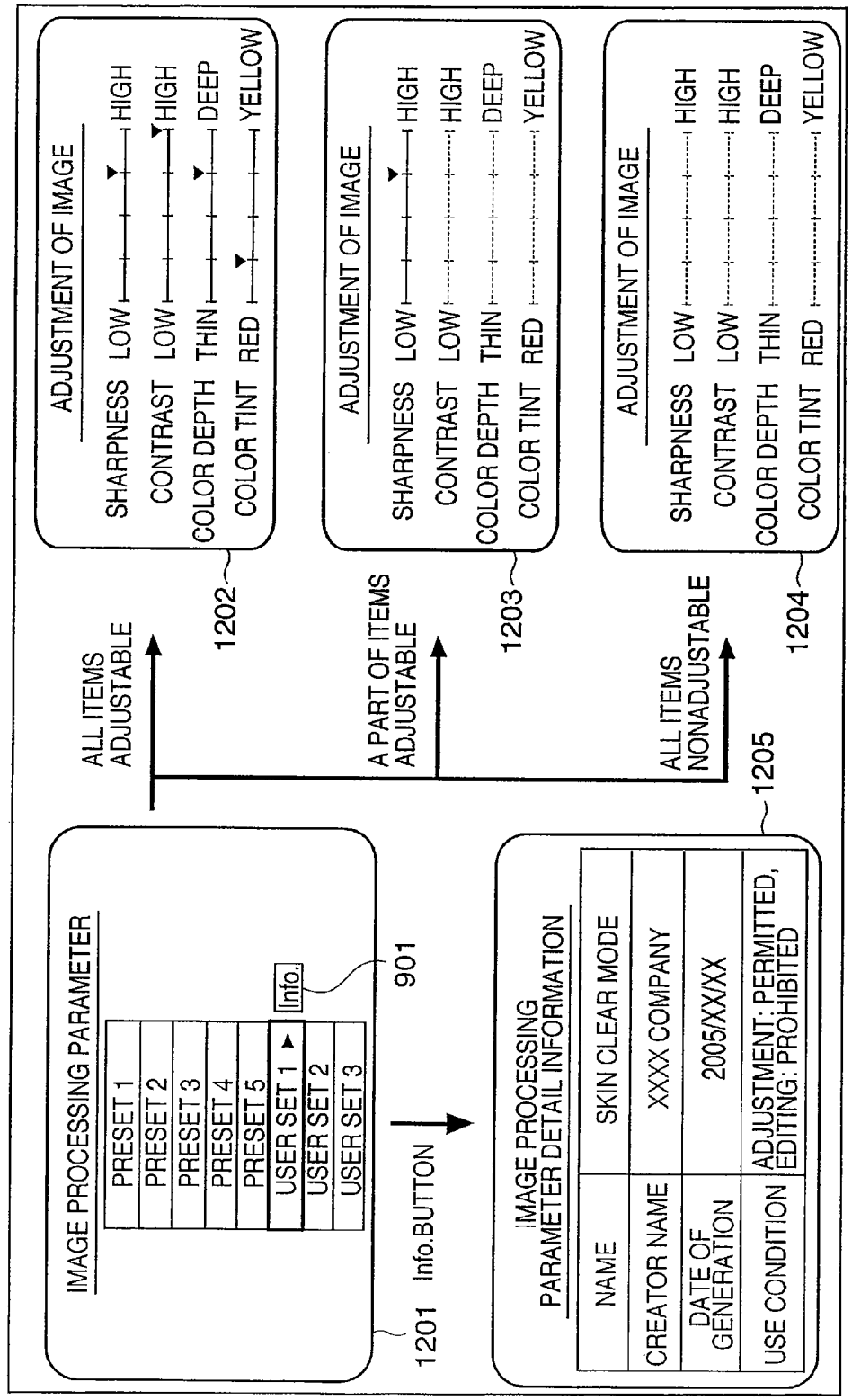
FIG. 11 is an explanatory view of limitation regarding image processing parameter adjustment items in an image sensing apparatus.
Figure 12:
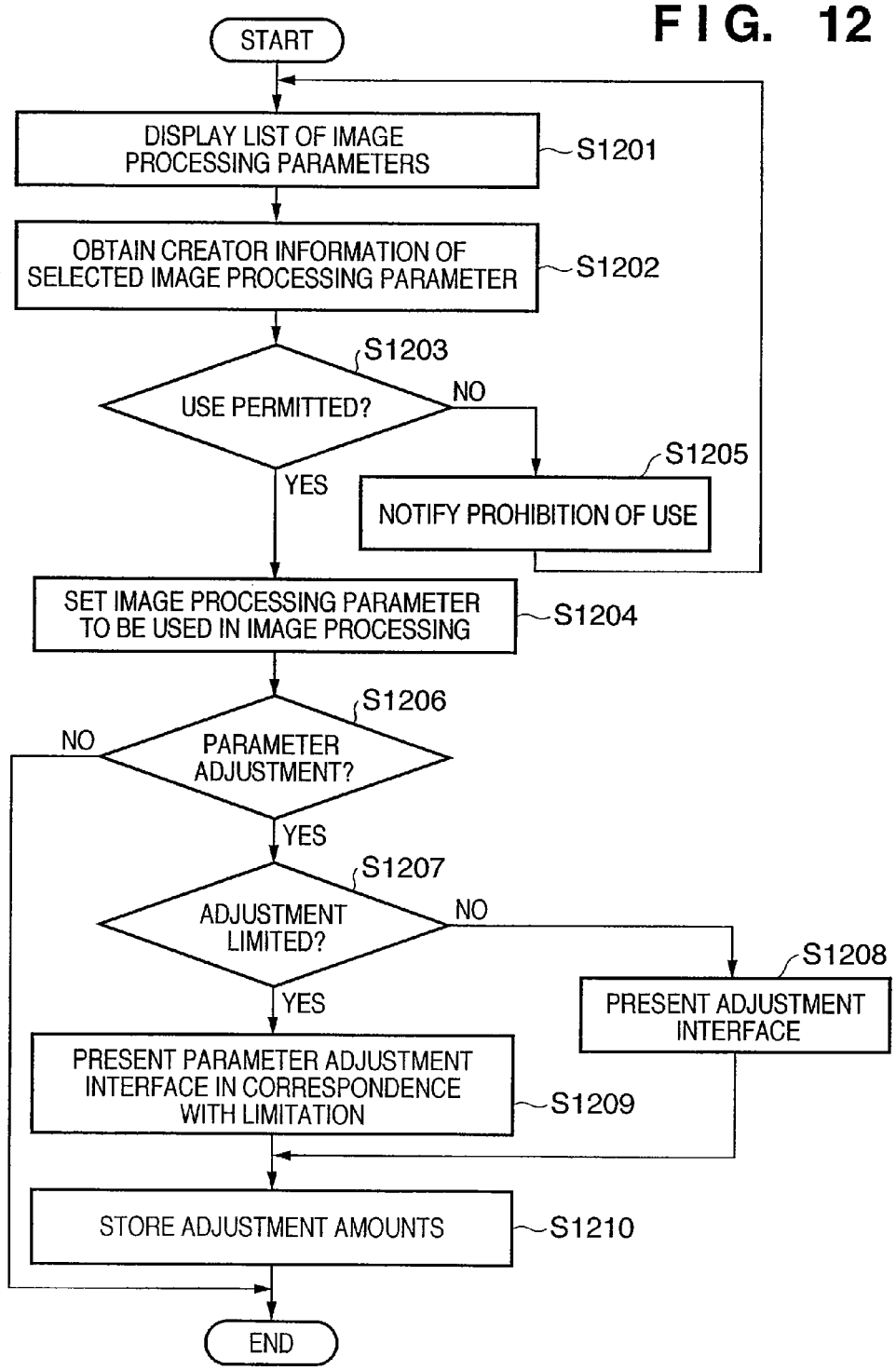
FIG. 12 is a flowchart showing image processing parameter adjustment processing in a digital camera.

The limitation of adjustment items of an image processing parameter will be described using FIGS. 11 and 12. When the user performs a predetermined operation using the image processing parameter selection unit 113, an image processing parameter selection screen (a list of image processing parameter files held in the image processing parameter storing unit 107) as shown as a screen 1201 in FIG. 11 is displayed on the display unit 112 (S1201). At this time, when creator information is set in the image processing parameter of an image processing parameter file, an "Info." button 901 indicating that creator information is set is displayed on the right side of an image processing parameter name. When the user depresses the "Info." button 901 using the image processing parameter selection unit 113, information on the creator of the selected image processing parameter such as a creator name (53) and use condition information (55) are displayed on the display unit 112. A screen 1205 in FIG. 11 shows the status of the display at this time. Note that when the use permission/prohibition information 55a indicates prohibition of use by a third person, such image processing parameter file is not placed in the list on the screen 1201, or information indicating the prohibition of use is notified upon depression of the "Info." button 901.

Next, the user selects an image processing parameter to be used using the image processing parameter selection unit 113. When an image processing parameter is selected, it is determined whether or not the image processing parameter can be used based on the use permission/prohibition information 55a in the creator information attached to the selected image processing parameter (S1202 and S1203). When it is determined that the image processing parameter can be used, the image processing parameter is set in the image processing unit 106 (S1204). Note that when the use permission/prohibition information 55a indicates prohibition of use, it is determined whether or not the image processing parameter can be used by predetermined authentication processing. When authentication is unsuccessful and it is determined that the use of the image processing parameter is prohibited, the prohibition of use is notified to the user by display a message indicating the prohibition of use on the display unit 112 (S1205). Note that as the predetermined authentication processing, authentication information such as a password is registered in the creator name storage area 53, and authentication processing is performed using the registered authentication information.

Next, when the user indicates to perform adjustment of the image processing parameter, the process proceeds from step S1206 to step S1207. The items adjustable by the image processing parameter adjusting unit 108 defer in accordance with the adjustment permission/prohibition information 55c of selected image processing parameter. The adjustment permission/prohibition information 55c of image processing parameter includes any one of information indicating that all the items of the image processing parameters can be adjusted, information indicating that a part of the items can be adjusted, and information indicating that all the items cannot be adjusted. When all the items can be adjusted, all the items are displayed as a screen 1202 in FIG. 11 on the display unit 112, and the user can perform fine adjustment in, for example, 5 levels on the respective items (S1207 and S1208). When there is limitation on the adjustment items and/or the adjustment range, an interface is displayed in correspondence with the limitation (S1207 and S1209). For example, when a part of the adjustment items can be adjusted, items which cannot be adjusted are grayed out as in a screen 1203 in FIG. 11. When all the items cannot be adjusted, all the items are grayed out as in a screen 1204 in FIG. 11, and any adjustment by the user cannot be performed. Note that FIG. 11 shows an example of display on the display unit 112 when the number of adjustment items is limited. When the range of an adjustment item is limited, a display is produced such that a bar of the adjustment item is shortened in correspondence with the limitation. In this manner, as limitation is posed on a part or all of the adjustment items, image processing not intended by the creator of the image processing parameter in the image sensing apparatus can be prevented. The set adjustment amounts are set available in the image processing unit 106 (S1210). Note that when all the adjustment items cannot be adjusted, "adjustment amount =0" is set.

Figure 13:
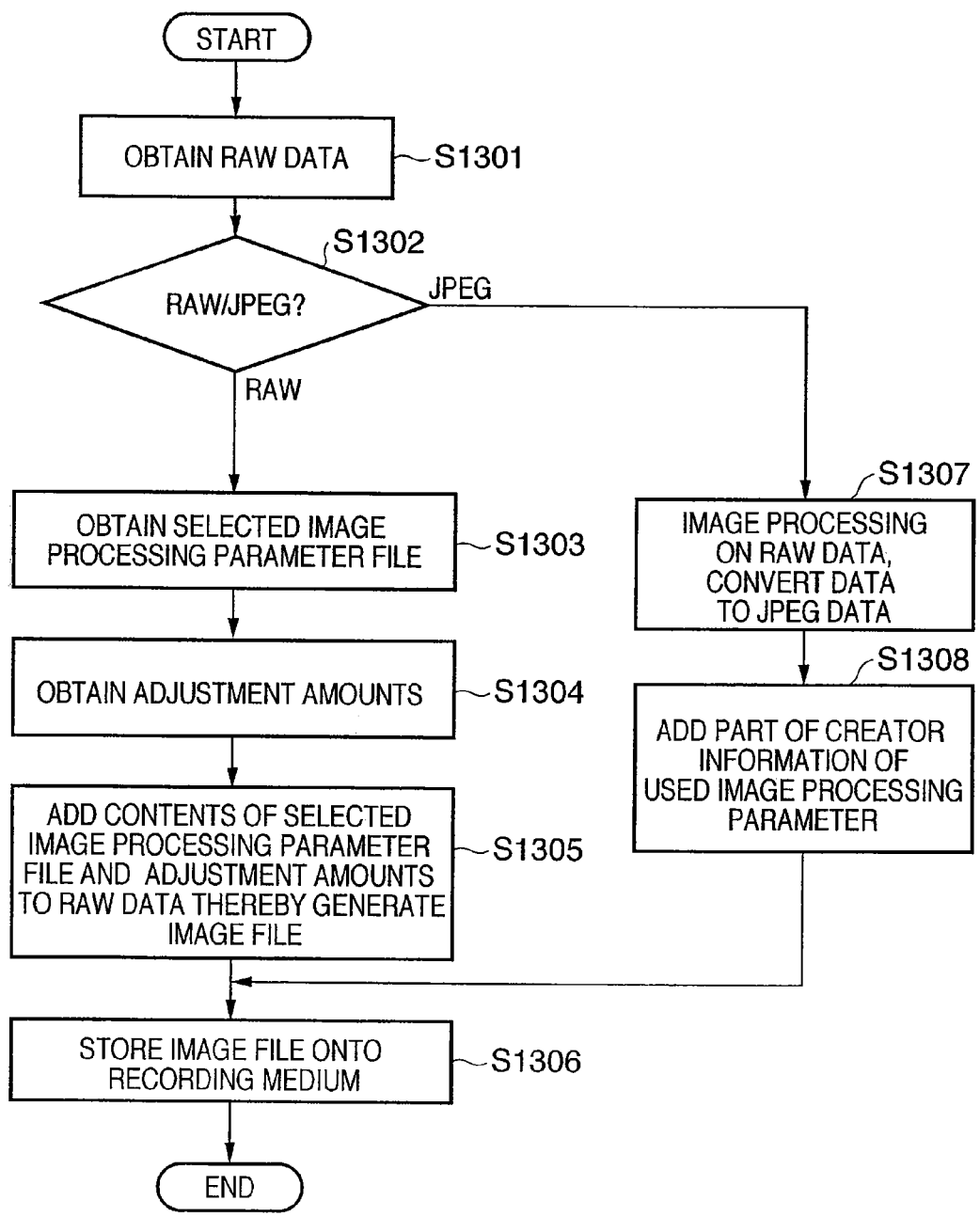
FIG. 13 is a flowchart showing image file generation processing upon photographing operation in the digital camera.

Next, processing from photographing to storage of image file will be described. FIG. 13 is a flowchart showing processing from photographing by the digital camera 10 to storage of image file. When image sensing is performed, raw data is stored into the memory 105 as described above. The image processing unit 106 obtains the raw data stored in the memory 105 (S1301). Then, when the recording mode selected by the recording mode selection unit 114 is a raw mode, the image processing unit 106 obtains a selected image processing parameter file, and obtains set adjustment amounts (S1302, S1303 and S1304). Then, the image processing unit 106 generates an image file by adding the contents of the image processing parameter file and the adjustment amounts to the raw data, and stores the image file onto the recording medium 111 (S1305 and S1306).

On the other hand, when the recording mode selected by the recording mode selection unit 114 is a JPEG mode, the image processing unit 106 performs image processing on the raw data in accordance with the selected image processing parameter and the set adjustment amounts, and converts the processed raw data to JPEG data (S1307). Then the image processing unit 106 obtains a part of the creator information (in this example, information in the parameter name storage area 51, the creator name storage area 53 and the change record information storage area 54) from the used image processing parameter file, and adds the obtained information to the JPEG data as an image file (S1308).

As described above, the digital camera 10 according to the present embodiment changes image processing parameter information to be added upon recording of photographed data onto the recording medium 111 in accordance with whether a selected recording mode is the raw image recording mode or JPEG image recording mode. When the raw image recording mode is selected, the data structure of image processing parameter as shown in FIG. 6 is attached to photographed data without any change. In this manner, the creator information of the image processing parameter is stored in the image file, and the contents of the image processing parameter unique to the creator can be protected upon execution of image processing using a personal computer. On the other hand, when the JPEG image recording mode is selected, information, obtained by subtracting information stored in the use condition storage area 55 and the image processing parameter storage area 56 from the data structure shown in FIG. 6, is attached to photographed data and the photographed data is recorded. In this manner, unnecessary information for the JEPG image can be omitted, and the contents of the used image processing parameter unique to the creator can be protected with a minimum amount of data.

The embodiment of the present invention has been described in detail as above, and further, the present invention can be implemented as a system, an apparatus, a method, a program or a storage medium. More particularly, the present invention can be applied to an apparatus comprising a single device or to system constituted by a plurality of devices.

Furthermore, the invention can be implemented by supplying a software program directly or indirectly to a system or apparatus, reading the supplied program code with a computer of the system or apparatus, and then executing the program code. In this case, the supplied program corresponds to the flowcharts shown in the figures in the embodiment.

Accordingly, since the functional processing of the present invention is implemented by the computer, the program code installed in the computer also implements the present invention. In other words, the claims of the present invention also cover a computer program for the purpose of implementing the functional processing of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiment can be implemented by this processing.

According to the present invention, a user who generated an image processing parameter can pose limitation on use of the image processing parameter by a third person.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-182183, filed Jun. 30, 2006, and Japanese Patent Application No. 2006-200054, filed Jul. 21, 2006, which are hereby incorporated by reference herein in their entirety.

What is claimed is:

1. An information processing apparatus for editing image processing parameters available in image processing by an image sensing apparatus, comprising:

an extraction unit adapted to extract creator information set by a creator of said image processing parameters attached to said image processing parameters;

an edition unit adapted to edit said image processing parameters thereby generate new image processing parameters;

a first limitation unit adapted to limit editing processing of said image processing parameters by said edition unit;

an adjustment unit adapted to adjust said image processing parameters;

a second limitation unit adapted to limit adjustment items for adjusting processing of said image processing parameters by said adjustment unit; and a designation unit adapted to designate limitations regarding the editing processing and the adjustment items to said first limitation unit and said second limitation unit based on the creator information extracted by said extraction unit.

2. The apparatus according to claim 1, wherein said first limitation unit determines whether or not the editing processing of said image processing parameters is permitted based on the creator information, and when the editing processing is not permitted, prohibits the editing processing of said image processing parameters by said edition unit.

3. The apparatus according to claim 1, wherein said edition unit adds information indicating the permission/prohibition of edition and said adjustment items designated by said designation unit, as creator information, to said new image processing parameters.

4. The apparatus according to claim 1, further comprising a third limitation unit adapted to limit using said image processing parameters based on the creator information extracted by said extraction unit, and wherein said designation unit adapted to designate a limitation to said third limitation unit.

5. The apparatus according to claim 1, further comprising a download unit adapted to download said image processing parameters via the Internet.

6. An image sensing apparatus for performing image processing on photographed data using image processing parameters, comprising:

an adjustment unit adapted to adjust an image processing characteristic upon image processing using the image processing parameters;

a processing unit adapted to process the photographed data using the image processing parameters adjusted by said adjustment unit;

a display unit adapted to display image data processed by said processing unit;

a limitation unit adapted to limit adjustment items for adjusting processing of said image processing parameters by said adjustment unit;

a first determination unit adapted to determine whether or not said image processing parameters can be used based on said creator information;

a second determination unit adapted to determine a limitation regarding said adjustment items based on said creator information and designate the limitation to said limitation unit; and wherein when said first determination unit determines that said image processing parameter can be used, said adjustment unit can adjust the image processing parameters in accordance with said limitation.

7. The apparatus according to claim 6, further comprising a generation unit adapted to, in a mode to record the photographed data as raw data, generate an image file by attaching the image processing parameters adjusted by said adjustment unit, with the creator information, to said raw data, and in a mode to record the photographed data as JPEG data, generate an image file by attaching a part of the creator information to said JPEG data.

8. The apparatus according to claim 7, wherein said image processing parameters adjusted by said adjustment unit include original image processing parameters prior to adjustment and an adjustment amount.

9. The apparatus according to claim 8, wherein said limitation unit limits the adjustment amount in each adjustment item.

10. An image processing parameter editing method for editing image processing parameters available in image processing by an image sensing apparatus, comprising:

an extraction step of extracting creator information set by a creator of said image processing parameters attached to said image processing parameters;

an edition step of editing said image processing parameters thereby generating new image processing parameters;

a first limitation step of limiting editing processing of said image processing parameters at said edition step;

an adjustment step of adjusting said image processing parameters;

a second limitation step of limiting adjustment items for adjusting processing of said image processing parameters at said adjustment step; and a designation step of designating limitations regarding the editing processing and adjustment items to said first and said second limitation steps based on the creator information extracted at said extraction step.

11. A storage medium holding a control program for causing a computer to execute the image processing parameter editing method in claim 10.

12. A control method for an image sensing apparatus for performing image processing on photographed data using image processing parameters, comprising:

an adjustment step of adjusting an image processing characteristic by changing the image processing parameters;

a processing step of processing the photographed data using the image processing parameters adjusted at said adjustment step;

a display step of displaying image data processed at said processing step;

a limitation step of limiting adjustment items for adjusting processing of said image processing parameters at said adjustment step;

a first determination step of determining whether or not said image processing parameters can be used based on said creator information;

a second determination step of determining a limitation regarding said adjustment items based on said creator information and designating the limitation to said limitation step; and wherein when what said image processing parameters can be used is determined at said first determination step, said adjustment step can adjust the image processing parameters in accordance with said limitation.

13. A storage medium holding a control program for causing a computer to execute the image sensing apparatus control method in claim 12.

* * * * *